United States Patent
Stokes et al.

(10) Patent No.: US 6,578,164 B1
(45) Date of Patent: Jun. 10, 2003

(54) METHOD FOR DETECTING TRANSIENT WRITE ERRORS IN A DISK DRIVE HAVING A DUAL TRANSDUCER SLIDER

(75) Inventors: John R. Stokes, Ogden, UT (US); Michael Dickson, Benson, UT (US); Yiping Ma, Layton, UT (US); Thomas Wilke, Boulder, CO (US)

(73) Assignee: Iomega Corporation, Roy, UT (US)

( * ) Notice: Subject to any disclaimer, the term of this patent is extended or adjusted under 35 U.S.C. 154(b) by 334 days.

(21) Appl. No.: 09/614,859

(22) Filed: Jul. 12, 2000

(51) Int. Cl.[7] ............................................. G11C 29/00
(52) U.S. Cl. ........................................ 714/719; 360/53
(58) Field of Search ................................ 714/718, 719, 714/819, 824, 715, 799, 42, 48, 54, 57; 369/275.1, 275.3, 275.5, 53.1, 53.31, 53.33, 53.35, 43; 360/53, 131, 135, 18, 31, 81, 86, 88, 97.01

(56) References Cited

U.S. PATENT DOCUMENTS

| | | | |
|---|---|---|---|
| 4,459,554 A | 7/1984 | Mattison | 330/107 |
| 4,460,872 A | 7/1984 | Mattison | 330/252 |
| 4,479,093 A | 10/1984 | Mattisson | 330/258 |
| 4,494,226 A | 1/1985 | Hazel et al. | 369/45 |
| 4,622,564 A | 11/1986 | Kaku et al. | 346/160 |
| 4,893,207 A | 1/1990 | Maury et al. | 30/114 |
| 5,255,270 A | * 10/1993 | Yanai et al. | 360/53 |
| 5,283,779 A | * 2/1994 | Otsuki | 369/116 |
| 5,324,926 A | * 6/1994 | Horiguchi et al. | 235/494 |
| 5,588,007 A | 12/1996 | Ma | 371/21.2 |
| 5,636,085 A | 6/1997 | Jones et al. | 360/103 |
| 5,650,887 A | 7/1997 | Dovek et al. | 360/75 |
| 5,920,540 A | * 7/1999 | Satoh | 369/275.1 |
| 6,009,314 A | 12/1999 | Björk et al. | 455/83 |

FOREIGN PATENT DOCUMENTS

| | | |
|---|---|---|
| EP | 0 404 247 A1 | 12/1990 |
| EP | 0 474 428 A1 | 3/1992 |
| EP | 0889 474 A1 | 1/1999 |
| JP | 6122102 | 9/1986 |
| WO | WO 01/27924 A1 | 4/2001 |

OTHER PUBLICATIONS

Ryuichi Katayama et al., *Multi–Beam Optical Disk Drive For High Data Transfer Rate Systems*; Japanese Journal of Applied Physics, Tokyo, JP, Part I, No. 2B, Feb. 31, 1992, pp 630–634.

Anonymous, *Simulation of Magnetic Disk Defects by Off–Track Writing and Reading*; IBM Technical Disclosure Bulletin, vol. 30, No. 2, Jul. 1, 1987, pp. 649–651.

K.B. Klaassen, J.C. L. van Peppen, "Electronic Abatement of Thermal Interference in (G)MR head Output Signals", IEEE Transactions on Magentics, vol. 33, No. 5, Sep. 1997.

* cited by examiner

*Primary Examiner*—Christine T. Tu
(74) *Attorney, Agent, or Firm*—Woodcock Washburn LLP

(57) ABSTRACT

In a magnetic or optical disk drive the integrity of data written on a disk is verified by writing data to a portion of the disk, and immediately reading the data from the disk after it has been written. If there is error in reading the data and/or the data read from the disk is substantially different from the data written to the disk an error condition is generated. The error condition may be reporting the error to the host which decides whether to rewrite the data or immediately rewriting the data without further instructions from the host.

30 Claims, 6 Drawing Sheets

METHOD FOR DETECTING TRANSIENT WRITE ERRORS IN A DISK DRIVE HAVING A DUAL TRANSDUCER SLIDER

FIELD OF THE INVENTION

This invention relates to disk drives for computer systems. In particular, this invention relates to methods for detecting errors during write operations in disk drives, especially those caused by transient increases in flying heights.

BACKGROUND OF THE INVENTION

Maximizing the reliability of the data in disk drives, both magnetic and optical, is a key objective of disk drive designers. Unfortunately, that objective often conflicts with the similarly important need for performance. That is, by increasing the reliability performance measures, other performance characteristics such as the data transfer rate, could suffer. For example, when data is written to the disk drive the success of the write operation, i.e., whether the media accepted the data, is unknown. One sure way to guarantee the data after each write operation is by re-reading the recorded data after each write operation. However, a technique that requires all data written to be read as well would severely degrade the performance of the drive. On the other hand, such verification would ensure high reliability of the data. This verification procedure is referred to as a "write with verify." Write with verify takes a long time to perform. It requires that the data be written, then the disk is rotated one fill revolution, the data is read, and then verified.

U.S. Pat. No. 5,588,007, Ma describes a method for detecting transient write errors based on difficulty in reading pre-recorded information on the disk such as servo marks, ID marks and others. It also discusses that in the event of such difficulty, the drive will automatically read the data it just wrote. If errors were encountered during this write process, the drive will either re-write the data or report errors to the host system which will in most cases issue a rewrite operation. However, the pre-recorded information covers only about 20% of the disk space. Therefore, this technique cannot catch all hard errors caused by bad writes. This technique catches about 30% of non-recoverable data errors in one implementation.

In disk drives where (G)MR heads are used, an ID-less format further reduces the effectiveness of the transient error detection method described in U.S. Pat. No. 5,588,007. K. B. Klaassen, J.C.L. van Peppen,"Electronic Abatement of Thermal Interference in (G)MR head Output Signals", IEEE Transactions on Magnetics, Vol. 33, No.5, Sep. 1997 and U.S. Pat. No. 5,650,887 Dovek, et al. describe what is referred to as (G)MR (Giant Magneto Resistance) Technology which is commonly used in heads for hard disk drives. (G)MR heads have been used in rigid disk drives, where a (G)MR read transducer and an inductive write transducer are built into one slider. (G)MR technology is used to increase the density requirement. This increase in linear density possible with (G)MR Technology makes the "phantom write" problem more severe. A"phantom write" is a non-recoverable data error caused by temporary spacing loss during a write. This leads to a greater need for the type of automatic transient error detection method described in U.S. Pat. No. 5,588,007.

Similarly in optical recording systems, such as CDRW drives, the only way to verify that data was written correctly is to read it back, taking additional time.

It is an object of the present invention to improve transient error detection to make it more effective in higher density magnetic and optical disk drives.

SUMMARY OF THE INVENTION

In accordance with the present invention, the integrity of data written on a magnetic or optical disk is verified by writing data to a portion of the disk, immediately reading the data from the disk after it has been written, and, if the data read from the disk is substantially different from the data written to the disk, generating an error condition. "Immediately," as used herein, means within one revolution of the disk.

The present invention recognizes the fact that in recording heads where (G)MR sensors are used there are two transducers, a (G)MR sensor for reading the data and an inductive sensor for writing the data. Furthermore, the two transducers are arranged such that they are in very close proximity of each other and usually line up in the recording track direction. Ideally, the (G)MR read sensor is located towards the trailing edge of the recording head, making it possible to read the data that was just written by the write sensor.

In the case of optical drives, a separate optical read path is provided that can be active simultaneously with writing. Immediately after writing, this optical read path allows verification of the written data. The read path includes appropriate optics and mechanics to place a read spot trailing the write spot by a small amount on the disk. This read spot can be attached to the optical pick up unit (OPU) fine actuator. The read spot can be generated by custom optics such as a hologram from the right laser diode, or it can be generated from a separate low power read laser diode. The reflected light from this read spot is directed to a detector that does not receive the reflected light from the right spot. Thus reading the data occurs immediately after writing the data.

The foregoing objects, features, and advantages of the invention will be better understood from the following more detailed description and appended claims.

SHORT DESCRIPTION OF THE DRAWINGS

Description of the Preferred Embodiment

Figure 1:
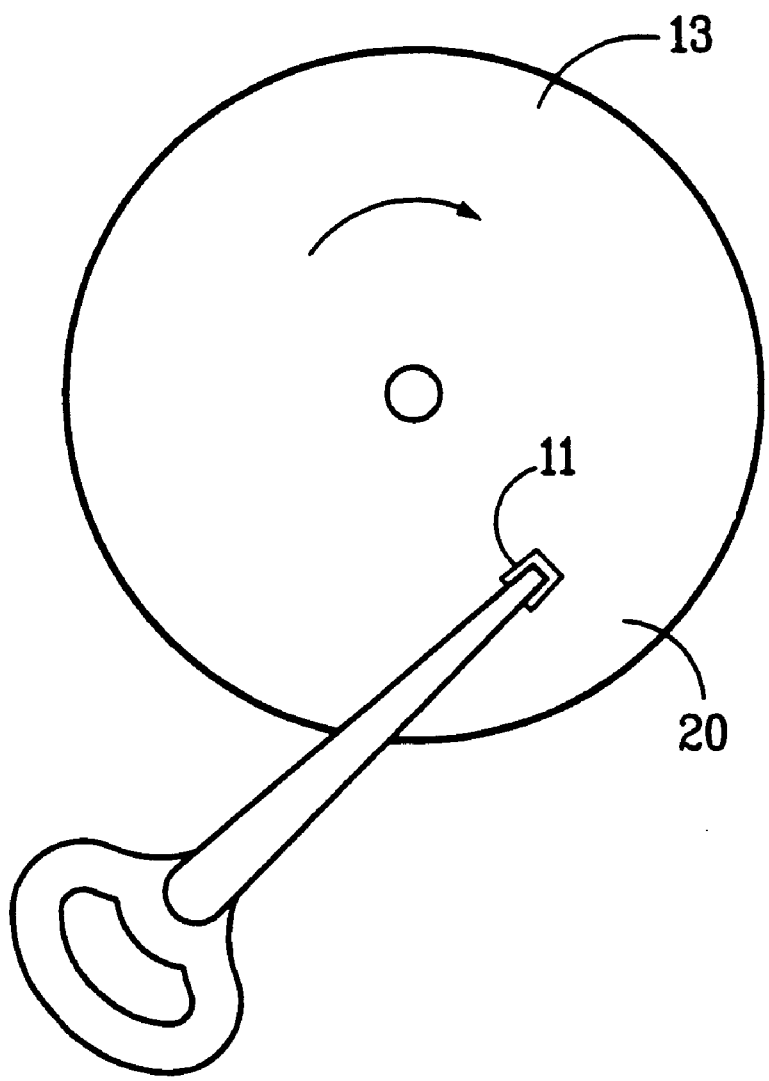
FIG. 1 is a plan view of a flexible disk, and a flexure with a read/write transducer.
Figure 2:
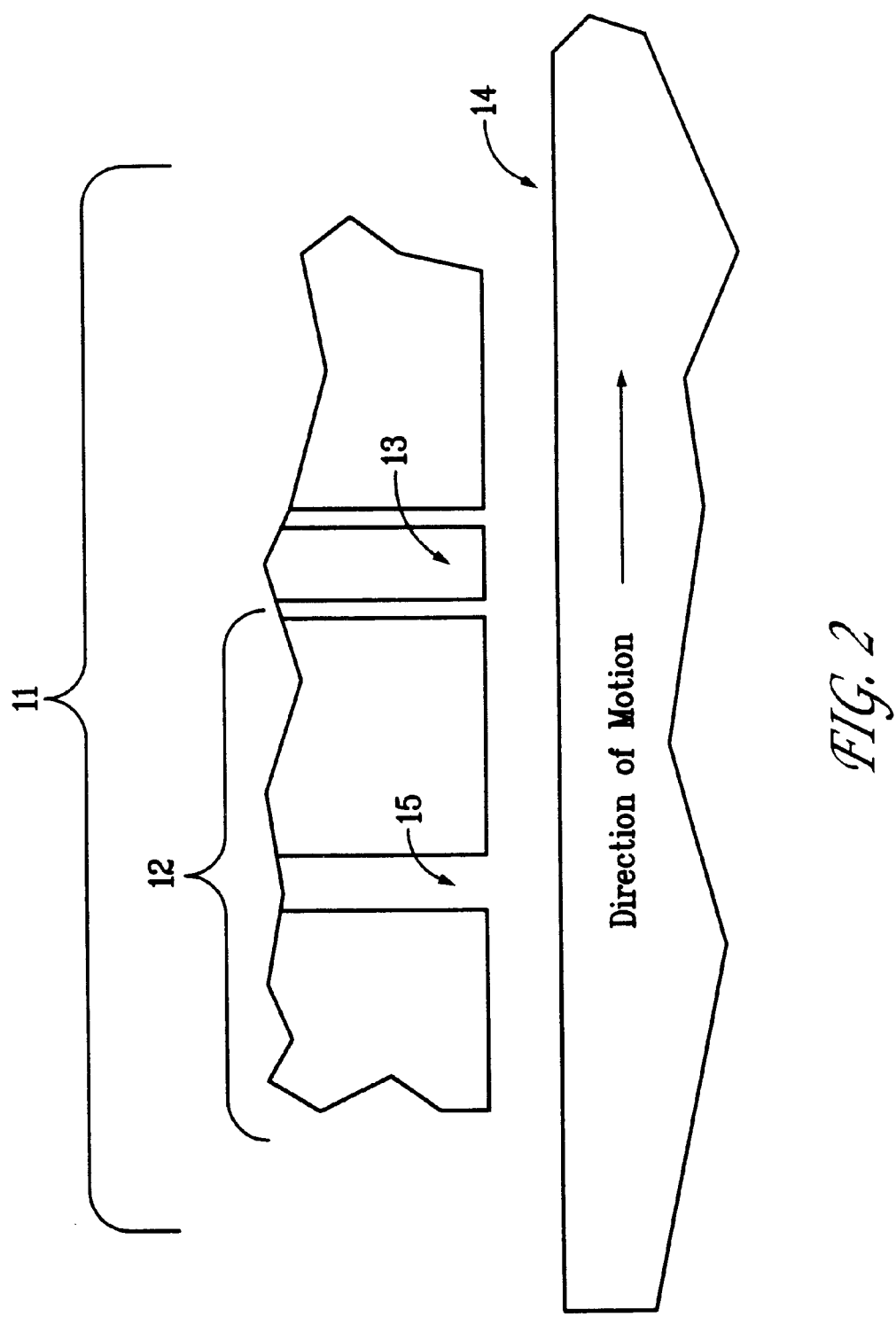
FIG. 2 shows a read/write head slider for use in a magnetic disk drive.

FIGS. 1 and 2 show a magnetic disk drive with a slider mounted on flexures, such as is shown in U.S. Pat. No. 5,636,085, Jones, et al. A magnetic read/write head assembly includes a slider 11 with transducers 12 and 13 which read and write data recorded on the flexible magnetic medium 14. Write transducer has a recording gap 15 which writes data.

The read (verify) sensor 13 is positioned in the direction of movement of media 14 from the recording gap 15.

In accordance with the invention, transducer 12 is used to write data and transducer 13 is used to immediately read the data which has been written.

Transducer 12 is in close proximity to transducer 13 on the same slider. Transducers 12 and 13 are arranged in the direction of the track of data which has been written so that transducer 12 writes data and transducer 13 immediately reads the data which has been written. Transducer 12 is connected to appropriate channel electronics for writing and transducer 13 is connected to error-detection electronics.

Figure 3:
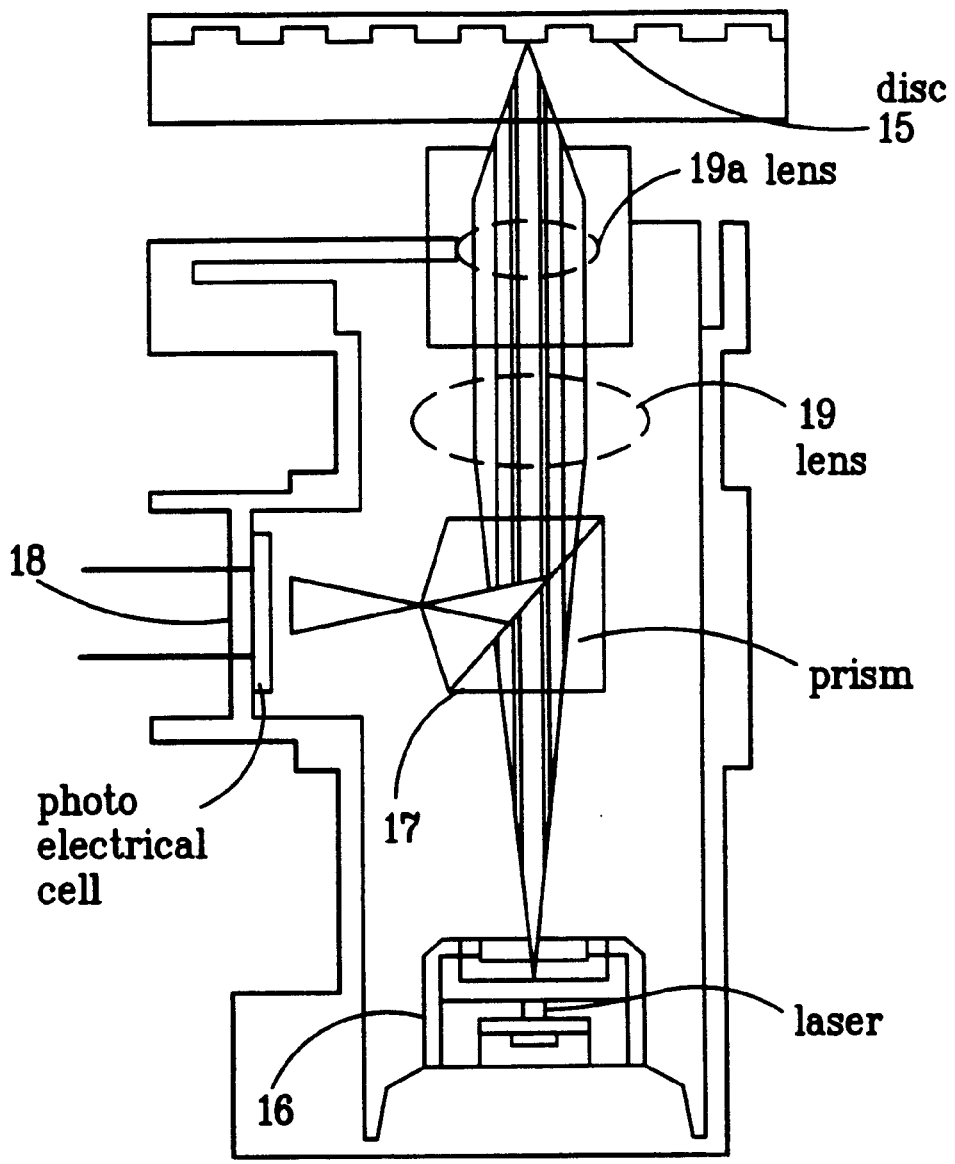
FIG. 3 shows a CD type optical pick up for an optical recording application.

FIG. 3 shows a CD-optical pick up which can be used in optical recording on the optical disk 15. A recording laser 16 sends laser light to the surface of disk 15 to record data. While writing a beam splitter 17 directs a portion of the return beam into the read sensor 18. Lens 19 and 19a complete the optical path to and from the disk.

Figure 4:
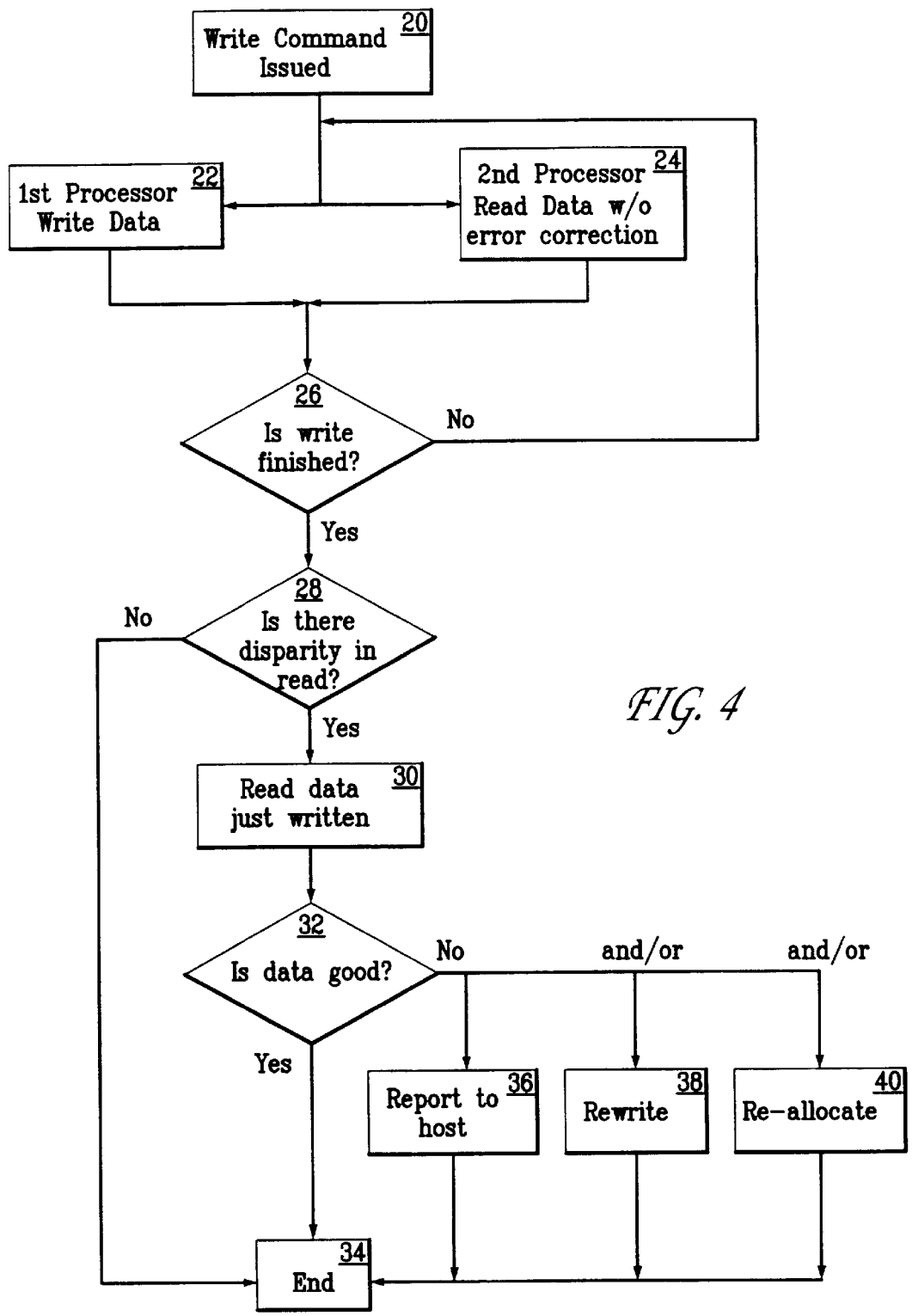
FIG. 4 is a flow diagram of the operation of a disk drive in accordance with the present invention.

FIG. 4 is a flow chart depicting the operation of the disk drive in accordance with the present invention. As indicated at 20, a write command is issued. In response, data is written to a portion of the disk as indicated at 22. Data is written by a first processor through the write transducer. Data is immediately read through a read transducer by a second processor as indicated at 24 in FIG. 4. During this read operation, no extensive error correction is used since it could take more than one revolution in time. When writing is finished, as indicated at 26, a determination is made of whether there is any error during the read back process and/or the data read from the disk is substantially different from the data written to the disk. This step is indicated at 28. If there is disparity in the read, the data is read again as indicated at 30. A disparity is defined as either an error during the read or the data is different from what was written. During this second read process, full error correction scheme will be used. If the data is good as determined at 32, this is the end of the sub-program as indicated at 34. If the data is not good an error condition is generated. This error condition may be reporting the error to the host as indicated at 36 or rewriting the data as indicated at 38, or reallocating the data as indicated at 40. Reallocating is rewriting data at a different location on the disk.

Many products on the market today with (G)MR sensors are configured such that the read gap is located towards the leading edge of the slider in reference to the write gap such that the drives have to wait essentially one revolution to read the data just written using the current invention. Substantial performance limitation could result. An alternative approach is to have the read gap read the data that was already on the disk before being overwritten by the write gap. In this approach, the read operation precedes the write operation. Since disk surfaces are certified for defects during the drive and/or cartridge manufacturing process, all available data sectors contain readable data. These data can be either written at the factory or in the field during regular usage. Any error during the read operation would indicate potential spacing loss and an error flag would be generated. Error recovery scheme as described in steps 30 through 40 of previous paragraph would be activated if an error flag is indicated.

It is realized that the present approaches require the use of two separate processors, increasing the cost of the disk drive controller. An alternative method can be used where the read back signal is monitored for negative modulation. Since the presence of negative modulation in the read back signal indicates spacing loss during the write process, an error condition will be set. This alternative approach is more cost effective than the method with two microprocessors.

Figure 6:
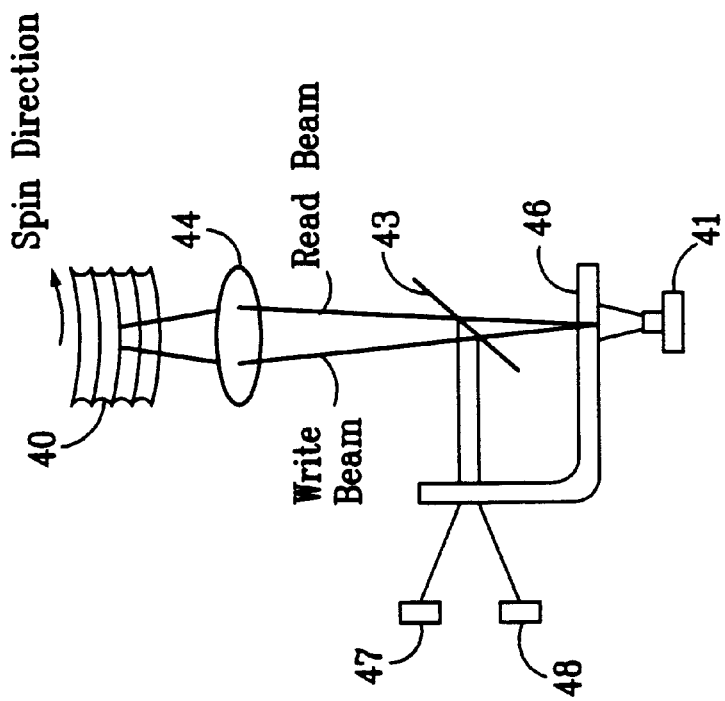
FIG. 6 shows an alternate embodiment of optical read and write paths.
Figure 5:
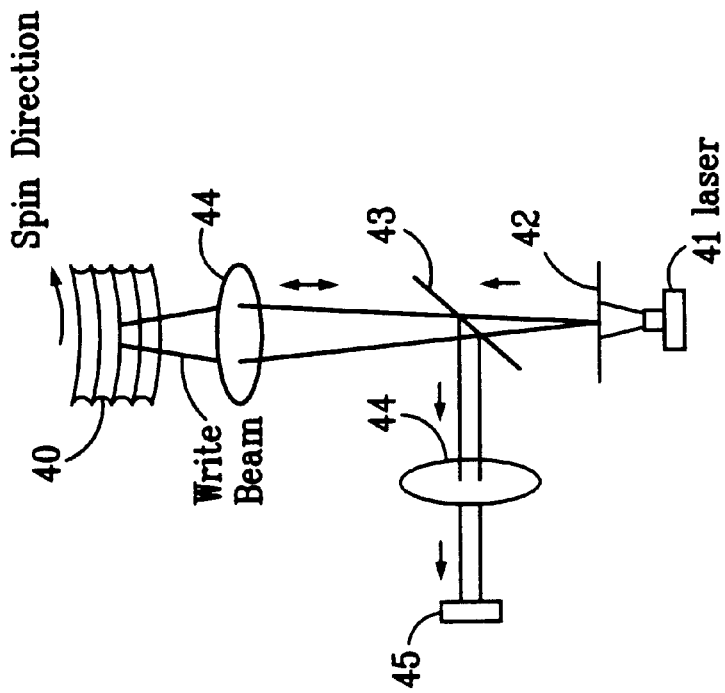
FIG. 5 shows the optical write and read paths.

FIGS. 5 and 6 depict techniques to generate an optical spot closely following the read spot. The read spot must be centered on the same track 40 that is being written. While the read detector can be a separate module from the writing OPU, a better embodiment is to integrate the read spot detector into the OPU. As shown in FIG. 5 light from laser 41 passes through diffraction grating 42 and beam splitter 43 and focus lens 44 to a track 40 on the optical disk. A portion of the reflected light is transmitted by beam splitter 43 through collector lens 44 to the multi-beam detector 45.

As shown in FIG. 6 light from laser 41 passes through hologram 46 which combines the grating and light collection functions. The reflected light is directed to a read spot detector 47 and a write spot detector 48.

Detection of the reflected light from the read spot can be accomplished using a photodiode, similar to the common photodiodes used in OPUs. Since the write power is much higher than the read power, a method to shield the reflected light from the write spot from reaching the read spot detector is necessary. A variety of techniques are possible for getting a good quality reflected signal on the read spot detector. Some possible techniques include using beam splitters, diffraction gratings, holograms, baffles, and/or customized detectors.

Standard decoding techniques can be used to decode the detected signal. The data received from the read spot can be compared to the data was intended to be written in hardware or software.

Figure 7:
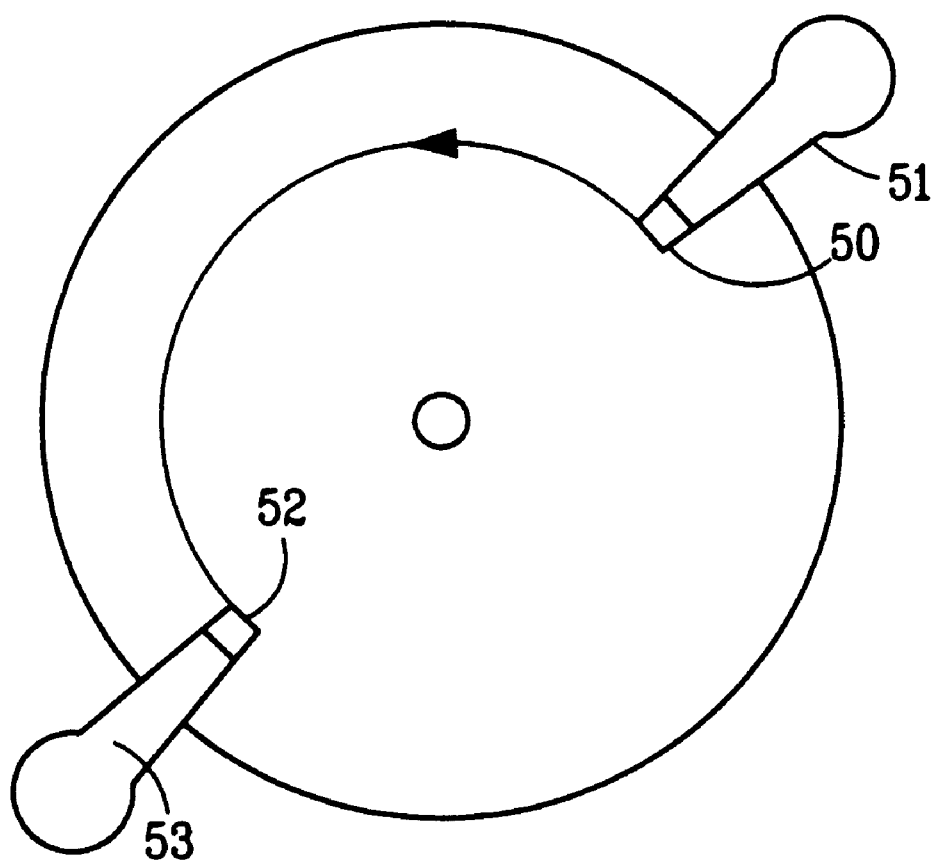
FIG. 7 shows reading immediately after writing by a separate read slider/actuator located down track from the write slider/actuator.

As shown in FIG. 7 it is also possible to immediately read after write by putting the read transducer on a separate slider/actuator located down track from the slider/actuator having the write transducer. In FIG. 7 the write transducer 50 is carried on actuator 51. Read transducer 52, carried by actuator 53 is located down track from actuator 50. The read transducer 52 reads data to verify good writing within one revolution of the data being written.

While a particular embodiment has been shown and described various modifications may be made. All modifications within the true spirit and scope of the invention are covered by the appended claims.

What is claimed is:

1. A method of verifying the integrity of data written on a disk in a disk drive system, comprising the steps of:

writing data to a portion of said disk;

within one revolution of said disk, reading said data from said disk after it has been written; and if there is a disparity in reading said data, generating an error condition.

2. The method recited in claim 1 wherein the step of generating an error condition comprises the further step of re-writing the data to the disk.

3. The method recited in claim 1 wherein the step of generating an error condition comprises the further step of reporting an error condition.

4. The method recited in claim 1 wherein the steps of writing and reading are performed by two transducers in close proximity on the same slider.

5. The method recited in claim 4 wherein said writing and reading are performed by transducers arranged in the direction of the track of data which has been written.

6. The method recited in claim 5 wherein one of said transducers writes said data and the other transducer reads said data, said write transducer preceding said read transducer in the direction of said track.

7. The method recited in claim 1 wherein said disk is a magnetic recording disk.

8. The method recited in claim 1 wherein said disk is an optical recording disk.

9. The method recited in claim 1 wherein said disparity is an error during the read process.

10. The method recited in claim 1 wherein said disparity is that the data read is substantially different from the data written.

11. The method recited in claim 1 wherein said disparity is that negative modulation exists in said data.

12. The method recited in claim 1 wherein the steps of writing and reading are performed by two transducers on two separate sliders arranged along the same track.

13. A method of selectively verifying data written to a disk in a disk drive system, comprising the steps of:
   a) receiving a request to write data to disk;
   b) writing at least one portion of said data to disk;
   c) reading at least one signal arranged on said disk within one revolution of said disk after writing subsequent to said at least one portion of said data such that an error reading said at least one signal indicates that the step of writing said at least one portion of said data may have been erroneous;
   d) comparing said at least one signal to a predetermined value;
   e) if said at least one signal is substantially different from said predetermined value, reading said first portion of said data;
   f) comparing said at least one portion of said data read from the disk to a corresponding at least one portion of said data written to said disk; and
   g) if said at least one portion of said data read from said disk is substantially different from said corresponding at least one portion of said data written to said disk generating an error condition.

14. The method recited in claim 13 wherein the step of generating an error condition comprises the further step of re-writing the first data section to disk.

15. The method recited in claim 13 wherein the step of generating an error condition comprises the further step of reporting an error condition.

16. The method recited in claim 13 wherein the steps of writing and reading are performed by two transducers in close proximity on the same slider.

17. The method recited in claim 16 wherein said transducers are arranged in the direction of the track of data which has been written.

18. The method recited in claim 17 wherein one of said transducers writes said data and the other transducer reads said data, said write transducer preceding said read transducer in the direction of said track.

19. A method of verifying data written to a disk in a disk drive system, comprising the steps of:
   a) receiving a request to write data to disk;
   b) reading at least one portion of existing data at the site to be written;
   within one revolution of said disk, writing the data to said disk;
   generating an error condition if there is error in reading said one portion of existing data.

20. The method recited in claim 19 wherein the step of generating an error condition comprises the further step of reading the data just written.

21. The method recited in claim 19 wherein the step of generating an error condition comprises the further step of re-writing the data section to disk.

22. The method recited in claim 19 wherein the step of generating an error condition comprises the further step of reporting an error condition.

23. The method recited in claim 19 wherein the steps of writing and reading are performed by two transducers in close proximity on the same slider.

24. The method recited in claim 23 wherein said transducers are arranged in the direction of the track of data which has been written.

25. The method recited in claim 24 wherein one of said transducers read existing data and the other transducer write the data to be written, said read transducer preceding said write transducer in the direction of said track.

26. The method recited in claim 19 wherein said error in reading is that negative modulation exists in said data.

27. A method of verifying the integrity of data written on a disk in a disk drive system, having two transducers in close proximity on the same slider, comprising the steps of:
   writing data to a portion of the disk with one of said transducers;
   immediately reading said data from said disk with the other of said transducers after said data has been written; and
   if there is a disparity in reading said data, generating an error condition.

28. A method of verifying the integrity of data written on a disk in a disk drive system, comprising the steps of:
   writing to a portion of said disk;
   immediately reading said datya from said disk after it has been written; and
   if negatively modulation exists in the data read in said reading step, generating an error condition.

29. The method recited in the claim wherein the steps of writing and reading are performed by two transducers on two separate sliders arranged along the same track.

30. A method of verifying data written to a disk in a disk drive system having two transducers in close proximity on the same slider, comprising the steps of:
   a) receiving a request to write data to disk;
   b) reading with one of said transducers at least one portion of existing data at the site to be written;
   immediately writing the said data to said disk with the other of said transducers; and
   generating an error condition if there is error in reading said one portion of existing data.

* * * * *